United States Patent Office 3,218,280
Patented Nov. 16, 1965

3,218,280
AQUEOUS BLEND OF AN EMULSION COPOLY-
MER, AN AMMONIATED COPOLYMER AND
THE HEXAMETHYL ETHER OF HEXAMETHYL-
OL MELAMINE
Jerry Norman Koral, Stamford, George Evans Bruner,
Wilton, and John Harold Daniel, Jr., Old Greenwich,
Conn., assignors to American Cyanamid Company,
Stamford, Conn., a corporation of Maine
No Drawing. Filed May 16, 1963, Ser. No. 281,011
4 Claims. (Cl. 260—29.4)

This invention relates to a composition of matter comprising a physical blend in an aqueous medium of (A) a latex copolymer, (B) a water soluble ammoniated copolymer and (C) hexamethyl ether of hexamethylol melamine. More particularly this invention relates to a coating composition in an aqueous medium comprising a substantially water insoluble latex emulsion of a copolymer of methyl methacrylate or a styrene or a ring-substituted alkyl styrene or a ring-substituted halo styrene, a lower alkyl ester of acrylic acid and an α,β-ethylenically unsaturated monocarboxylic acid, blended with a water soluble ammoniated copolymer of an ehylenically unsaturated monocarboxylic acid and an alkyl ester of an α,β-ethylenically unsaturated monocarboxylic acid and hexamethyl ether of hexamethylol melamine.

One of the objects of the present invention is to produce a composition of matter which can be used as a coating composition which comprises a physical blend in an aqueous medium of three components: (A) an emulsion copolymer, (B) a water soluble ammoniated copolymer and (C) hexamethyl ether of hexamethylol melamine. A further object of the present invention is to produce a coating composition which will be applicable from an aqueous medium which will yield on baking glossy films with markedly enhanced impact values while showing good hardness values.

These and other objects of the present invention will be discussed in greater detail hereinbelow.

THE EMULSION COPOLYMER

The emulsion copolymer of the present invention is the preponderant component present in the total composition and will be present in an amount varying from about 55% to about 85% and preferably from about 70% to 80% by weight based on the total weight of all of the resin solids in the composition. In the emulsion copolymer there are three essential ingredients of which the first is a monomer selected from the group consisting of methyl methacrylate, styrene, ring-substituted alkyl styrenes and ring-substituted halo styrenes. All of these alkyl and halo styrenes are polymerizable compounds which can be copolymerized with the other components in the emulsion copolymer as outlined in greater detail hereinbelow.

The first component in the emulsion copolymer is present in an amount varying between about 35% and 60% by weight based on the total weight of the emulsion terpolymer solids. Among the alkyl styrenes which may be used in the preparation of the emulsion terpolymer are o-, m-, or p-methylstyrene, o-, m-, or p-ethylstyrene, 2,4-dimethylstyrene, 2,5-dimethylstyrene, 3,4-diethylstyrene, 3,5-diethylstyrene and the like. Among the halo styrenes which may be used in the emulsion terpolymer used in the present invention are o-, m-, or p-chlorostyrene, o-, m-, or p-iodostyrene, o-, m-, or p-bromostyrene, 2,4-dichlorostyrene, 3,4-dichlorostyrene and the like. Any of the members of the first component used in the terpolymer of the present invention may be used either singly or in combination with one another, i.e., the methyl methacrylate may be used alone or in combination with styrene and/or with any one or more of the ring-substituted alkyl and halo styrenes. Whether used singly or in combination the proportion to the total composition remains the same.

The second component of the emulsion copolymer is a lower alkyl ester of acrylic acid. Illustrative of these lower alkyl esters are methyl acrylate, ethyl acrylate, propyl acrylates, butyl acrylates and the like. These acrylic acid esters may be used either singly or in combination with one another but it is preferred to use ethyl acrylate as the sole second component. The amount of the acrylic acid ester used in the emulsion copolymer may be varied from about 35% to about 60% by weight based on the total solids of the emulsion terpolymer whether used singly or in combination.

The third component of the emulsion copolymer is an α,β-ethylenically unsaturated monocarboxylic acid. Illustrative of these acids are acrylic acid, methacrylic acid, ethacrylic acid and the like. These acids may be used either singly or in combination with one another. The total amount of the acid component in the emulsion terpolymer may be varied from about 3% to about 10% by weight based on the total solids in the emulsion copolymer. The percentages recited hereinabove with respect to each of the components in the emulsion copolymer will necessarily add up to about 100% in a given copolymer composition. In preparing these emulsion copolymers a part of the third component may be replaced with other water-solubility imparting monomers such as acrylamide, methacrylamide, ethacrylamide, methylene bisacrylamide, isopropyl acrylamide, n-tertiary butyl acrylamide or one may use a hydroxy alkyl ester of α,β-ethylenically unsaturated carboxylic acid such as β-hydroxy ethyl methacrylate and the like. These hydroxy alkyl esters are disclosed, to a significant extent, in the U.S. Patent No. 2,681,897 which patent is incorporated herein by reference in order to avoid unnecessary redundancies. When the substitution of these latter materials is made in place of part of the α,β-ethylenically unsaturated monocarboxylic acid there should still remain at least about 1½% by weight of said acid and the remainder totaling 3% to about 10% by weight based on the total solids of the substituent in the emulsion copolymer.

THE AMMONIATED COPOLYMER

The second component in the composition of the present invention is a water soluble ammoniated copolymer of an α,β-ethylenically unsaturated monocarboxylic acid and an alkyl ester of an α,β-ethylenically unsaturated monocarboxylic acid. This water soluble ammoniated copolymer will be present in the total composition in an amount varying between about 5% and 15% and preferably 10% by weight based on the total weight of the polymeric solids in the total composition. The water soluble ammoniated copolymer will have in its composition two essential ingredients although a third or fourth monomer may be used to prepare a terpolymer or tetrapolymer if desired. Reference is made to the U.S. Patent 2,906,724 which discloses the water soluble ammoniated copolymer which may be used in the composition of the present invention. Said patent is incorporated herein by reference in its entirety in order to avoid any unnecessary redundancy. In the cited patent, Daniel contemplated a water soluble ammoniated copolymer of from about 5% to 50% by weight of an α,β-ethylenically unsaturated carboxylic acid and correspondingly from about 50% to about 95% of an alkyl ester of an α,β-ethylenically unsaturated monocarboxylic acid. The compositions of the present invention are therefore somewhat more limited than Daniel with respect to the water soluble ammoniated copolymer in that the first component must be a monocarboxylic acid. The illustrations of the α,β-ethylenically unsaturated monocarboxylic acids and the alkyl esters thereof as shown in Daniel are equally applicable here. In the water soluble ammoniated copolymer used in the present invention certain other polymerizable vinylidene monomers such as those containing the polymerizable $CH_2=C<$ groups may be used to advantage with the α,β-ethylenically unsaturated monocarboxylic acids of and the alkyl esters of α,β-ethylenically unsaturated monocarboxylic acids such as styrene, ortho-, meta- or para-alkyl styrenes such as the o-, m- or p-methyl, ethyl, propyl and butyl styrenes, 2,4-dimethyl styrene, 2,3-dimethyl styrenes, 2,5-dimethyl styrene, vinyl naphthenate, acrylonitrile, methacrylonitrile, halo ring or side chain sytrenes such as α-chloro styrene, ortho-, meta- or para-chloro styrenes, 2,4-dichlorostyrene, 2,3-dichloro styrene, 2,5-dichloro styrene or the alkyl side chain styrenes such as α-methyl styrene, α-ethyl styrene and the like. Additionally, one may make use of such polymerizable vinyl monomers as acrylamide, methacrylamide, ethacrylamide, methylenebisacrylamide, isopropylacrylamide, N-tertiary-butylacrylamide, β-hydroxyethylmethacrylate and the like. These additional monomers may be used either singly or in combination with one another or may be left out of the composition entirely. The amount of monomer of diminished water solubility will vary considerably and directly in amount with the available hydrophilic groups in the polymer. When 50% of acrylic acid is used in the polymer, larger amounts of a monomer such as styrene may be used whereas when 5% of acrylic acid is used, little or no styrene should be used. As a result of this limitation, it is generally advisable to use not more than 25% by weight of these polymerizable monomers of diminished water solubility in the total weight of the ultimate copolymer comprising the ethylenically unsaturated monocarboxylic acid and the alkyl ester of the ethylenically unsaturated monocarboxylic acid. The total soluble ammoniated copolymers used in the present invention are rendered water soluble by reaction with ammonium hydroxide to form the ammonium salt of the copolymer, The amount of ammonium hydroxide used to produce the water-soluble salt of the copolymer may be varied over a fairly wide range. For instance, one may use a sufficient amount of ammonium hydroxide to form the half salt by using ½ mol equivalent of ammonium hydroxide per mol of carboxyl groups available in the copolymer as produced. One may furthermore use a full equivalent of ammonium hydroxide per mol equivalent of carboxyl groups present in the copolymer as prepared. Still further, one could use an excess of ammonium hydroxide to insure complete salt formation in amounts up to and even exceeding 4 mol equivalents of ammonium hydroxide per mol of carboxyl groups present in the copolymer.

As used herein, the expression copolymer is used to designate a polymeric material which results from the inter-polymerization of two or more polymerizable monomers.

HEXAMETHYL ETHER OF HEXEMETHYLOL MELAMINE

The third component in the composition of the present is hexamethyl ether of hexamethylol melamine. This is a well known compound as is shown in the British Plastics publication dated February 1943 entitled "Melamine-Formaldehyde Condensation Products" by A. Gams, G. Widmer and W. Fisch, pages 508–520, inclusive. The hexamethyl ether of hexamethylol melamine will be used in the composition of the present invention in an amount varying between about 10% and 30% by weight based on the total polymer or resin solids in the composition. Preferably one would use between about 15 and 20% of the hexamethyl ether of hexamethylol melamine.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

A copolymer of 85 parts of butyl acrylate and 15 parts of acrylic acid is prepared in the manner outlined in Example 3 of the U.S. Patent 2,906,724. The copolymer is then ammoniated and 65 parts of the copolymer solids are blended with 35 parts of hexamethyl ether or hexamethylol melamine in an aqueous medium and adjusted to a 50% resin solids solution. To this solution there is added an additional 35.5 parts of hexamethyl ether of hexamethylol melamine which had been prewarmed to 50° C. before addition to the room temperature solution. Separately there is prepared a solution of 12 parts of ethylene glycol monobutyl ether, 5.5 parts of guanyl-urea phosphate and 5 parts of a 28% solution of ammonium hydroxide dissolved in 50 parts of water. This solution is then added to the resin solution and the total is thoroughly mixed. To this solution mixture there is added 190 parts of titanium dioxide which is then premixed and ground on a 3 roller mill. There is then separately prepared an acrylic latex of 39.2 parts of styrene, 54.2 parts of ethyl acrylate, 3.1 parts of acrylic acid and 3.6 parts of β-hydroxy ethyl methacrylate in an aqueous medium by a conventional procedure. The latex is adjusted to about 46% solids solution. 642 parts of the latex solution is then blended with the pigmented resinous dispersion with low agitation. The resulting enamel is thinned to a viscosity of 15–20 sec. in a No. 4 Ford cup so as to be sprayable in a conventional manner. The enamel thus produced is sprayed on Bonderite 100 panels and allowed to air dry for 30 minutes and then baked at 300° F. for an additional 30 minutes. The coating on the panels exhibited a 60° gloss of 94, a Sward hardness of 46 and a front impact of 152 in./lbs.

Example 2

35.5 parts of hexamethyl ether of hexamethylol melamine are warmed to 50° C. and added to 100 parts of the blend of the ammoniated copolymer of butyl acrylate and acrylic acid with the hexamethyl ether of hexamethylol melamine as in Example 1 to effect solution. A solution is prepared of a mixture of 5.5 parts of guanyl-urea phosphate, 5 parts of 28% solution of ammonia in water and 12 parts of ethylene glycol monobutyl ether dissolved in 45 parts of water. This mixture is then added to the resin dispersion and the total is thoroughly mixed. 150 parts of rutile titanium dioxide are then added to this resin solution, premixed and ground on a three roller mill. The resulting pigmented dispersion is then blended into a latex comprising a terpolymer of 40 parts of styrene, 55 parts of ethyl acrylate and 5 parts of acrylic acid with low agitation. The resulting enamel is then thinned as in Example 1, sprayed on panels, dried and baked to produce a 60° gloss of 89, a Sward hardness of 46 and a front impact of 96 in./lbs.

Example 3

31.5 parts of hexamethyl ether of hexamethylol melamine are warmed to 50° C. and are added to 100 parts of a 50% solids solution of a blend of 65 parts of the ammoniated copolymer of butyl acrylate and acrylic acid with 35 parts of hexamethyl ether of hexamethylol melamine, said copolymer having the same proportions as in Example 1 and the total components are mixed thoroughly to effect solution. To the solution is added a mixture of 5.5 parts of guanylurea phosphate, 5.0 parts of a 28% solution of ammonia in water, 12.5 parts of ethylene glycol monobutyl ether dissolved in 45 parts of water. The solution is mixed thoroughly again and there is then added 150 parts of rutile titanium dioxide, premixed and then ground on a 3 roller mill. The resultant pigment dispersion is then blended in with an acrylic latex with low agitation. The acrylic latex is a preformed aqueous dispersion (45% solids) of a terpolymer of 40 parts of styrene, 55 parts of ethyl acrylate and 5 parts of acrylic acid. The resulting enamel when thinned to a viscosity of 15–20 seconds in a No. 4 Ford cup could be sprayed in a conventional manner. When applied to Bonderite 100 metal panels and allowed to air dry for 30 minutes followed by a baking for 30 minutes at 300° F., a coating is obtained which exhibits a 60° gloss of 89, a Sward hardness of 42 and a front impact strength of 96 in./lbs.

*Example 4*

Example 3 is repeated in substantially all details with the following components:

| | |
|---|---|
| Titanium dioxide (rutile) | 150.0 |
| 50% solids aqueous solution of a blend of 35 parts of MF$_6$Me$_6$ and 65 parts of an ammoniated copolymer of 85 parts of butyl acrylate and 15 parts of acrylic acid | 100.0 |
| MF$_6$Me$_6$ | 31.5 |
| Ethylene glycol monobutyl ether | 12.0 |
| Guanylurea phosphate | 5.5 |
| Ammonia (28%) | 5.0 |
| Water | 50.0 |
| Latex (styrene/ethyl acrylate/acrylonitrile/acrylic acid=35/50/10/5) (44% solids in water) | 553.0 |

The panels when sprayed, air dried and baked as in Example 3 displayed a 60° gloss of 91, a Sward hardness of 48 and a front impact of 64 in. lbs.

*Example 5*

Example 3 is repeated in substantially all details except with the following components:

| | |
|---|---|
| Titanium dioxide (rutile) | 150.0 |
| 50% solids aqueous solution of a blend of 35 parts of MF$_6$Me$_6$ and 65 parts of an ammoniated copolymer of 85 parts of butyl acrylate and 15 parts of acrylic acid | 150.0 |
| MF$_6$Me$_6$ | 54.0 |
| Ethylene glycol monobutyl ether | 25.0 |
| Guanyl urea phosphate | 4.5 |
| Ammonia (28%) | 4.0 |
| Water | 50.0 |
| Latex (methyl methacrylate/ethyl acrylate/methacrylate acrylamide/methacrylic acid=41/55/2/2 (46% solids in water) | 582.0 |

The panels after spraying, air dried and baked had the following characteristics, 60° gloss of 90, a Sward hardness of 46 and front impact of 28 in. lbs.

The emulsion copolymers used in the present invention are comparatively high molecular weight materials, namely those having a molecular weight varying between about 400,00 weight average molecular weight and about 1,500,000 to 2,000,000 molecular weight, determined by the weight average molecular weight test. Preferably, these emulsion copolymers will have a molecular weight varying between about 500,000 and 1,000,000 weight average molecular weight. These copolymers will have an intrinsic viscosity between about 0.4 and 1.5 and preferably 0.5 and 1.0.

The molecular weight of the ammoniated copolymer, on the other hand, is a comparatively low molecular weight polymeric material having an intrinsic viscosity varying between about 0.05 and 0.2 and preferably 0.1.

We claim:
1. A composition of matter comprising an aqueous blend of
   (A) an emulsion copolymer of from about 55% to about 85% of
      (1) from about 35% to 60% of a monomer selected from the group consisting of methyl methacrylate, styrene, ring-substituted alkyl and halo styrenes,
      (2) from about 35% to 60% of a lower alkyl ester of acrylic acid and
      (3) from about 3% to 10% of an α,β-ethylenically unsaturated monocarboxylic acid,
   (B) from about 5% to about 15% of an aqueous solution of a water soluble ammoniated copolymer of
      (1) from about 5% to 50% of an α,β-ethylenically unsaturated monocarboxylic acid and
      (2) from about 50% to about 95% of an alkyl ester of an α,β-ethylenically unsaturated monocarboxylic acid and
   (C) from about 10% to 30% of hexamethyl ether of hexamethylol melamine, wherein all percentages are percentages by weight based on the weight of the total resin solids.

2. A composition of matter comprising an aqueous blend of
   (A) an emulsion terpolymer of from about 55% to about 85% of
      (1) from about 35% to 60% of methyl methacrylate,
      (2) from about 35% to 60% of ethyl acrylate and
      (3) from about 3% to 10% acrylic acid,
   (B) from about 5% to about 15% of an aqueous solution of a water soluble ammoniated copolymer of
      (1) from about 5% to 50% of acrylic acid and
      (2) from about 50% to about 95% of butyl acrylate and
   (C) from about 10% to 30% of hexamethyl ether of hexamethylol melamine, wherein all percentages are percentages by weight based on the weight of the total resin solids.

3. A composition of matter comprising an aqeuous blend of
   (A) an emulsion terpolymer of from 55% to about 85% of
      (1) from about 35% to 60% of styrene,
      (2) from about 35% to 60% of ethyl acrylate,
      (3) from about 3% to 10% of acrylic acid,
   (B) from about 5% to about 15% of an aqueous solution of a water soluble ammoniated copolymer of
      (1) from about 5% to 50% of acrylic acid, and
      (2) from about 50% to about 95% of butyl acrylate and
   (C) from about 10% to 30% of hexamethyl ether of hexamethylol melamine, wherein all percentages are percentages by weight based on the weight of the total resin solids.

4. A composition of matter comprising an aqueous blend of
   (A) an emulsion terpolymer of from about 55% to about 85% of
      (1) from about 35% to 60% of a monomer selected from the group consisting of methyl methacrylate, styrene, ring-substituted alkyl and halo styrenes,
      (2) from about 35% to 60% of a lower alkyl ester of acrylic acid and
      (3) from about 3% to 10% of an α,β-ethylenically unsaturated monocarboxylic acid,
   (B) from about 5% to about 10% of an aqueous solution of a water soluble ammoniated copolymer of
(1) from about 5% to 50% of an α,β-ethylenically unsaturated monocarboxylic acid and
(2) from about 50% to about 95% of an alkyl ester of an α,β-ethylenically unsaturated monocarboxylic acid and
(C) from about 15% to 30% of hexamethyl ether of hexamethylol melamine, wherein all percentages are percentages by weight based on the weight of the total resin solids.

References Cited by the Examiner

UNITED STATES PATENTS

| | | | |
|---|---|---|---|
| 2,906,724 | 9/1959 | Daniel | 260—29.4 |
| 2,918,391 | 12/1959 | Hornibrook | 260—29.4 |
| 3,104,231 | 9/1963 | Fitch | 260—29.6 |

MURRAY TILLMAN, *Primary Examiner.*